(12) United States Patent
Sayer et al.

(10) Patent No.: US 11,900,129 B2
(45) Date of Patent: Feb. 13, 2024

(54) COMPUTER OPERATING SYSTEM SHUTDOWN SEQUENCING

(71) Applicant: INTERNATIONAL BUSINESS MACHINES CORPORATION, Armonk, NY (US)

(72) Inventors: Joseph Sayer, Bury St Edmunds (GB); Benjamin David Cox, Newbury (GB); Andrew David Lyell, Winchester (GB)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 120 days.

(21) Appl. No.: 17/653,550

(22) Filed: Mar. 4, 2022

(65) Prior Publication Data

US 2023/0281019 A1 Sep. 7, 2023

(51) Int. Cl.
*G06F 9/00* (2006.01)
*G06F 9/4401* (2018.01)
*G06N 20/00* (2019.01)

(52) U.S. Cl.
CPC ............. *G06F 9/442* (2013.01); *G06N 20/00* (2019.01)

(58) Field of Classification Search
CPC ................................ G06F 9/442; G06N 20/00
See application file for complete search history.

(56) References Cited

U.S. PATENT DOCUMENTS

| | | | |
|---|---|---|---|
| 7,788,474 B2 | 8/2010 | Switzer | |
| 9,015,505 B2 | 4/2015 | Tabone | |
| 10,102,045 B2 * | 10/2018 | Maki | G06F 9/442 |
| 2011/0202922 A1 | 8/2011 | Reynolds | |
| 2016/0034284 A1 * | 2/2016 | Won | G06F 9/44505 713/100 |

FOREIGN PATENT DOCUMENTS

CN 108845833 A 11/2018

OTHER PUBLICATIONS

Mell et al., "The NIST Definition of Cloud Computing", Recommendations of the National Institute of Standards and Technology, NIST Special Publication 800-145, Sep. 2011, 7 pages.

\* cited by examiner

*Primary Examiner* — Nitin C Patel
(74) *Attorney, Agent, or Firm* — Robert R. Aragona

(57) ABSTRACT

An embodiment for improving a shutdown sequencing of a computer operating system (OS) is provided. The embodiment may include receiving a command to initiate an OS shutdown. The embodiment may also include creating a first list of running tasks to terminate. The embodiment may further include in response to determining there is no historical data, sending a termination request to a particular running task. The embodiment may also include in response to determining the particular running task requires user input to terminate, increasing a weight of the particular running task. The embodiment may further include in response to determining there is an additional particular running task in the created first list, sending the termination request to the additional particular running task. The embodiment may also include in response to determining the additional particular running task requires the user input to terminate, increasing the weight of the additional particular running task.

20 Claims, 7 Drawing Sheets

COMPUTER OPERATING SYSTEM SHUTDOWN SEQUENCING

BACKGROUND

The present invention relates generally to the field of computing, and more particularly to a system for improving a shutdown sequencing of a computer operating system (OS).

In any OS shutdown or restart sequence of a computing device, software applications and/or running processes may be terminated prior to the shutdown or restart. During the OS shutdown or restart sequence, such as in a laptop computer, desktop computer, or mobile device, a user may be prompted to perform an input action. For example, the user may be prompted to save a file in a running software application. This user input prompt may prevent the shutdown or restart sequence from proceeding until the user has responded to the input prompt. Depending on the number of applications running, there may be a varying number of user input prompts. These input prompts may appear in different orders, and may be triggered when a termination request is sent to the application by the OS.

SUMMARY

According to one embodiment, a method, computer system, and computer program product for improving a shutdown sequencing of a computer operating system (OS) is provided. The embodiment may include receiving a command to initiate an OS shutdown from a user. The embodiment may also include creating a first list of running tasks to terminate according to a given order in response to receiving the command. The embodiment may further include in response to determining there is no historical data, sending a termination request to a particular running task of the one or more running tasks to terminate in accordance with a given order of the created first list. The embodiment may also include in response to determining the particular running task requires user input to terminate, increasing a weight of the particular running task. The increased weight of the particular running task may be added to a machine learning (ML) model as the historical data. The embodiment may further include in response to determining there is an additional particular running task in the created first list, iterating, until there is no additional particular running task: sending the termination request to the additional particular running task in accordance with the given order of the created first list; and in response to determining the additional particular running task requires the user input to terminate, increasing a weight of the additional particular running task. The increased weight of the additional particular running task may be added to the ML model as historical data. The embodiment may also include shutting down the OS.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
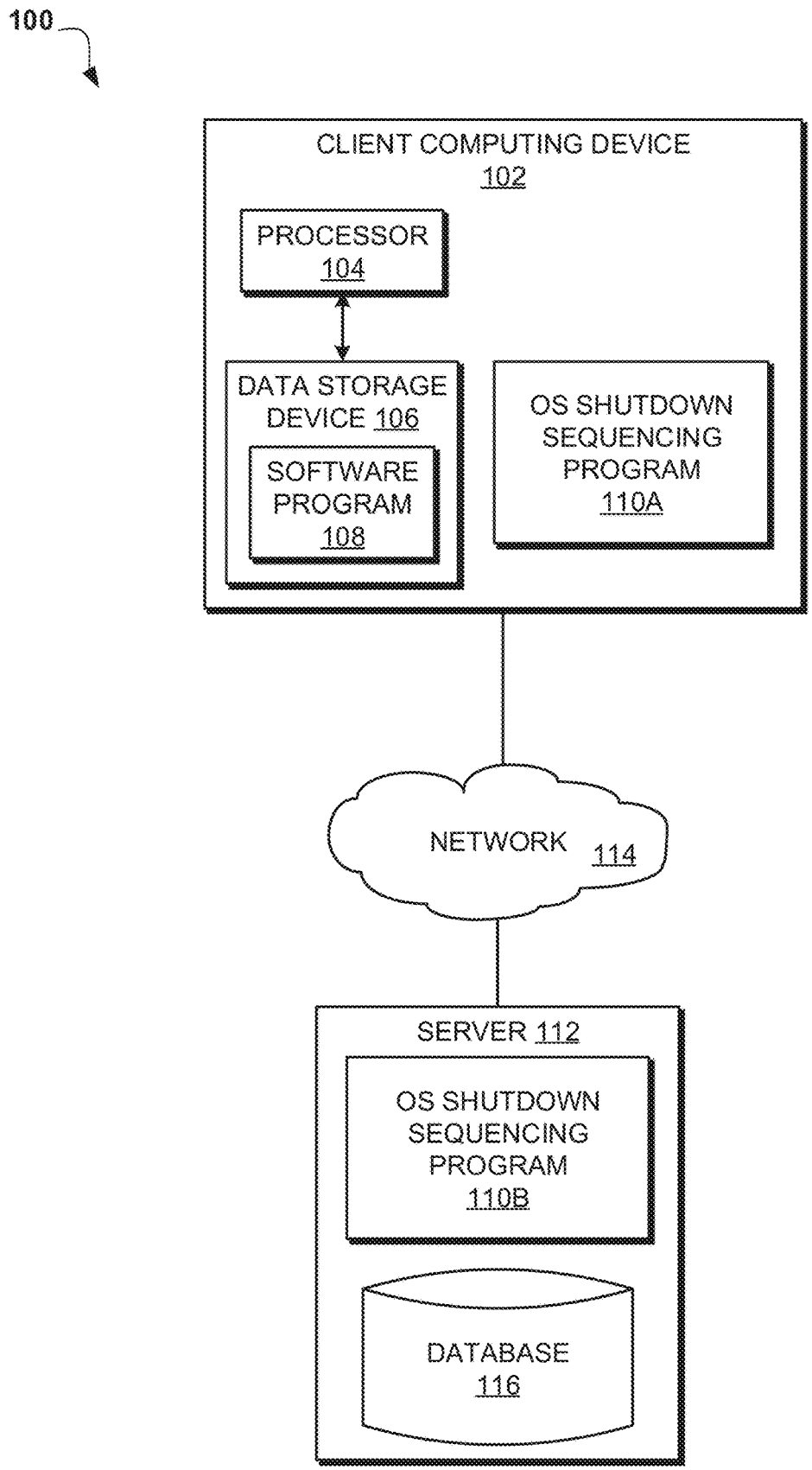
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present invention relate to the field of computing, and more particularly to a system for improving a shutdown sequencing of a computer operating system (OS). The following described exemplary embodiments provide a system, method, and program product to, among other things, determine whether one or more running tasks require user input to terminate and, accordingly, modify a given order of running tasks to terminate in a created first list based on a weight of each running task to terminate. Therefore, the present embodiment has the capacity to improve computers by dynamically bundling together running tasks that require user input to terminate, such that any termination request to the running tasks requiring user input may be sent earlier in the OS shutdown sequence.

As previously described, in any OS shutdown or restart sequence of a computing device, software applications and/or running processes may be terminated prior to the shutdown or restart. During the OS shutdown or restart sequence, such as in a laptop computer, desktop computer, or mobile device, a user may be prompted to perform an input action. For example, the user may be prompted to save a file in a running software application. This user input prompt may prevent the shutdown or restart sequence from proceeding until the user has responded to the input prompt. Depending on the number of applications running, there may be a varying number of user input prompts. These input prompts may appear in different orders, and may be triggered when a termination request is sent to the application by the OS. A running application that has been sent the termination request may prompt the user for input after the user has walked away from their computer. In such a scenario, the OS shutdown or restart sequence may stall since the user failed to respond to the input prompt. This problem is typically addressed by automating the OS shutdown or restart sequence based on factors such as access to a calendar of the user, a current speed of the computer, and/or a time of day. However, automating the OS shutdown or restart sequence takes the decision to shutdown or restart away from the user and may lead to a shutdown or restart at an inopportune time. It may therefore be imperative to have a system in place to prompt the user for input as early as possible during the OS shutdown or restart sequence. Thus, embodiments of the present invention may provide advantages including, but not limited to, prompting a user for input as early as possible during an OS shutdown or restart sequence, faster installing of required software updates, and flexibly learning which running applications require user input to terminate. The present invention does not require that all advantages need to be incorporated into every embodiment of the invention.

According to at least one embodiment, when a user wishes to shut down or restart the OS of their computing device, a command to initiate an OS shutdown may be received from the user in order to create a first list of one or more running tasks to terminate according to a given order in response to receiving the command. According to at least one embodiment, in response to determining there is no historical data relating to at least one of the one or more running tasks to terminate as requiring user input to terminate, a termination request may be sent to a particular running task in accordance with the given order of the created first list so that it may be determined whether the particular running task requires user input to terminate. In response to determining the particular running task requires the user input to terminate, a weight of the particular running task may be increased and added to a machine learning (ML) model as the historical data such that the ML model is able to learn from the historical data and modify the given order of the created first list. In response to determining there is an additional particular running task in the created first list, an iterative process may be performed, until there is no additional particular running task in the created first list, where: the termination request may be sent to the additional particular running task in accordance with the given order of the created first list so that it may be determined whether the additional particular running task requires the user input to terminate; and in response to determining the additional particular running task requires the user input to terminate, a weight of the additional particular running task may be increased and added to the ML model as the historical data. When there are no more additional particular running tasks in the created first list, the OS may shutdown.

According to at least one other embodiment, in response to determining there is the existing ML model, the first order of the created first list may be modified to include the one or more running tasks that require the user input to terminate at the front of the created first list based on the ML model executing ML on the existing data relating to the one or more running tasks that require the user input to terminate.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to determine whether one or more running tasks require user input to terminate and, accordingly, modify a given order of running tasks to terminate in a created first list based on a weight of each running task to terminate.

Referring to FIG. 1, an exemplary networked computer environment 100 is depicted, according to at least one embodiment. The networked computer environment 100 may include client computing device 102 and server 112 interconnected via a communication network 114. According to at least one implementation, the networked computer environment 100 may include a plurality of client computing devices 102 and servers 112, of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a software program 108 and an OS shutdown sequencing program 110A and communicate with the server 112 via the communication network 114, in accordance with one embodiment of the invention. Client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 4, the client computing device 102 may include internal components 402a and external components 404a, respectively.

The server computer 112 may be a laptop computer, netbook computer, personal computer (PC), a desktop computer, or any programmable electronic device or any network of programmable electronic devices capable of hosting and running an OS shutdown sequencing program 110B and a database 116 and communicating with the client computing device via the communication network 114, in accordance with embodiments of the invention. As will be discussed with reference to FIG. 4, the server computer 112 may include internal components 402b and external components 404b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

According to the present embodiment, the OS shutdown sequencing program 110A, 110B may be a program capable of receiving a command to initiate an OS shutdown or restart, determining whether one or more running tasks require user input to terminate, modifying a given order of running tasks to terminate in a created first list based on a weight of each running task to terminate, prompting a user for input as early as possible during an OS shutdown or restart sequence, faster installing of required software updates, and flexibly learning which running applications require user input to terminate. The OS shutdown sequencing method is explained in further detail below with respect to FIGS. 2A and 2B.

Figure 2A:
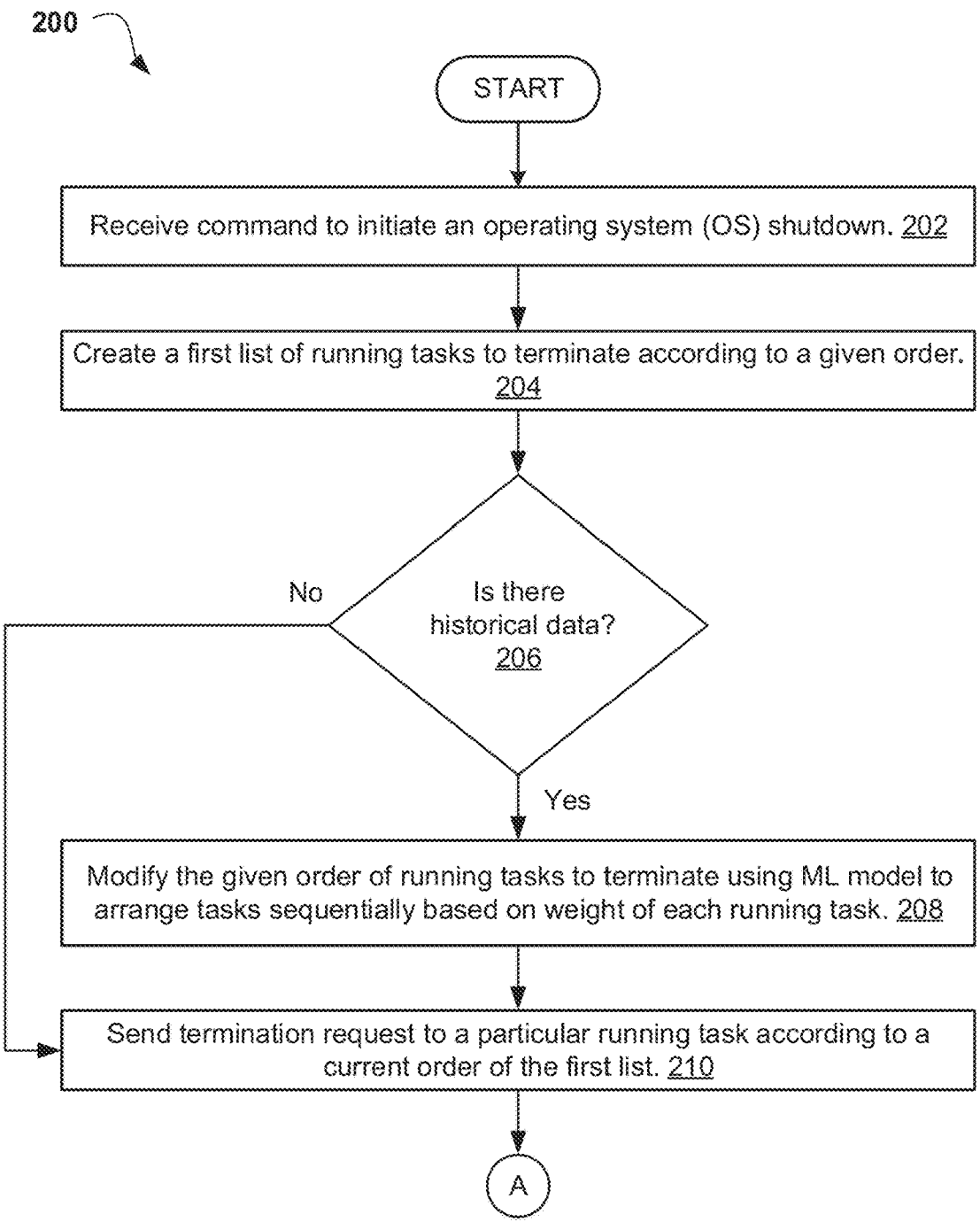
FIGS. 2A and 2B illustrate an operational flowchart for improving a shutdown sequencing of a computer operating system (OS) in an OS shutdown sequencing process according to at least one embodiment.
Figure 2B:
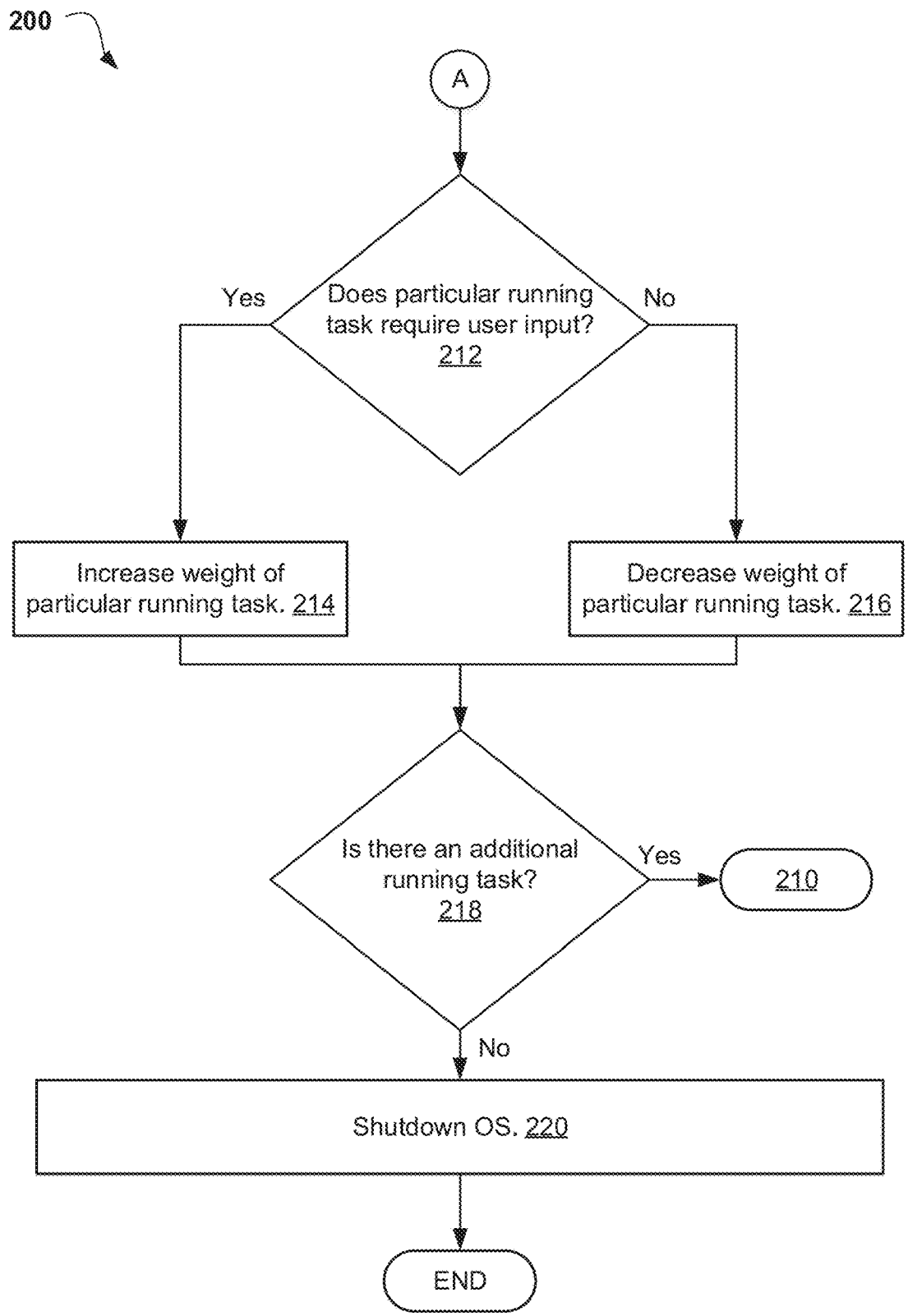
Figure 3:
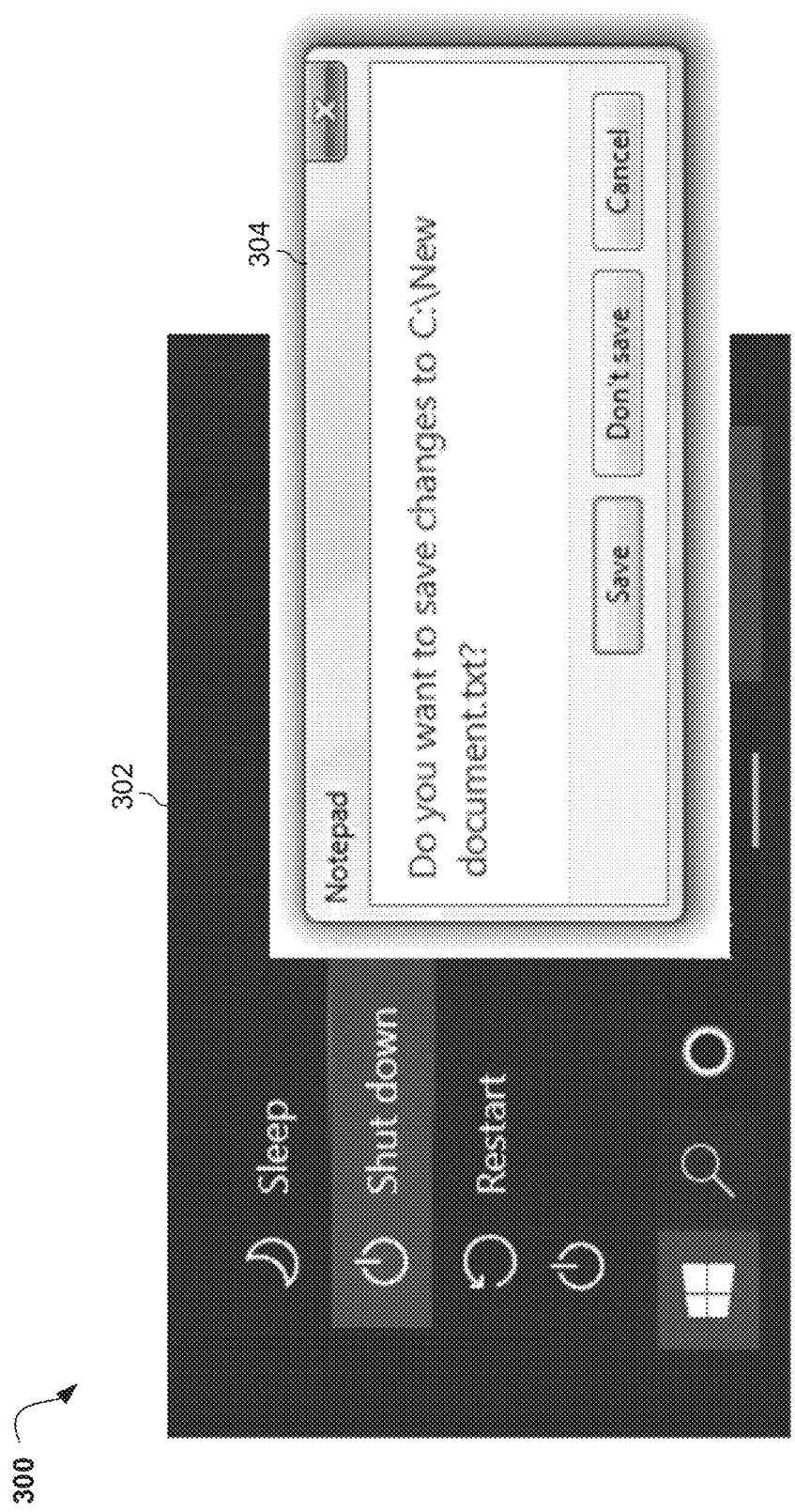
FIG. 3 is an exemplary diagram depicting an input prompt that is displayed to a user during the process in FIGS. 2A and 2B according to at least one embodiment.

Referring now to FIGS. 2A and 2B, an operational flowchart for improving a shutdown sequencing of a computer OS in an OS shutdown sequencing process 200 is depicted according to at least one embodiment. At 202, the OS shutdown sequencing program 110A, 110B receives the command to initiate the OS shutdown from the user. As used herein, "OS shutdown" encompasses the user either shutting down the OS or restarting the OS. For example, as illustrated in FIG. 3, many computers have a "power" button where the user can choose to "shut down" or "restart." In certain situations, the OS shutdown may be necessary. For example, the OS shutdown may be necessary to install a software update and/or clear the RAM to enable the computing device to run more smoothly. In other situations, the OS shutdown may be optional. For example, the user may wish to shutdown when transporting the computing device from one location to another. Depending on the type of OS and the number of software updates, the time taken for the software to update may vary from a few minutes to over an hour.

Then, at 204, the OS shutdown sequencing program 110A, 110B creates the first list of one or more running tasks to terminate according to the given order. The first list is created in response to receiving the command from the user. Examples of the running task include, but are not limited to, an open application (e.g., a web browser), an application running in the background of the OS (e.g., an email client application), and/or a process in which the OS is engaged (e.g., uploading or downloading a file). For example, applications A, B, C, D, and E may be the one or more running tasks to terminate. Thus, in this example, applications A, B, C, D, and E may be included in the first list of the one or more running tasks to terminate. The one or more running tasks to terminate that are included in this first list may be arranged in the given order.

According to at least one embodiment, the given order may be a random order. For example, applications A, B, C, D, and E may be ordered in the first list as B, C, A, E, and D. In this example, application B is at the front of the first list. According to at least one other embodiment, the given order may be a reverse order of application startup. For example, if application A is started first, application B is started second, application C is started third, application D is started fourth, and application E is started fifth, the first order may be E, D, C, B, and A. In this example, application E is at the front of the first list. It may be appreciated that the examples described above are not intended to be limiting, and that in embodiments of the present invention, the given order may be generated according to a variety of other techniques.

Next, at 206, the OS shutdown sequencing program 110A, 110B determines whether there is the historical data relating to the at least one of the one or more running tasks that require the user input to terminate. The historical data may include running tasks that have previously required the user input to terminate. This historical data may be stored in a database, such as database 116, and the OS shutdown sequencing program 110A, 110B may make the determination by querying the database. During a first implementation of the OS shutdown sequencing process 200, there may be no historical data. During a subsequent implementation of the OS shutdown sequencing process 200 (i.e., during a subsequent OS session after shutdown), there may be historical data. Accordingly, the first implementation of the OS shutdown sequencing process 200 may generate new data, whereas the subsequent implementation of the OS shutdown sequencing process 200 may both generate new data and utilize the historical data. In this manner, embodiments of the present invention may become smarter with each subsequent implementation.

In response to determining there is no historical data (step 206, "No" branch), the OS shutdown sequencing process 200 proceeds to step 210 to send the termination request to a particular running task in accordance with the given order. In response to determining there is the historical data (step 206, "Yes" branch), the OS shutdown sequencing process 200 proceeds to step 208 to modify the given order of the one or more running tasks to terminate in the created first list. Thus, as illustrated in the flowchart with respect to FIG. 2A, when there is no historical data, the "current order" may be the given order, whereas when there is the historical data, the "current order" may be the modified order.

Then, at 208, the OS shutdown sequencing program 110A, 110B modifies the given order of the one or more running tasks to terminate in the created first list. The given order is modified based on the weight of each running task to terminate. The weights may be a numerical value (e.g., one, two, three, etc.) corresponding to how many times each running task required the user input to terminate, described in further detail below with respect to step 212. These weights may be included in the historical data, and may be increased or decreased in real-time, described in further detail below with respect to steps 214 and 216. As described above with respect to step 204, the given order may be random or a reverse order of application startup. Thus, the modified order may be an order where the one or more running tasks to terminate are arranged in the first list from a highest weighted running task to a lowest weighted running task.

For example, according to at least one embodiment where the given order is random, the applications may be ordered in the first list as B, C, A, E, D, and F, where application B is at the front of the list. This random order may now be modified based on the weight of each of the one or more running tasks to terminate. Continuing the example, the weight of application B may be two, the weight of Application C may be three, the weight of application A may be zero, the weight of Application E may be negative one (i.e., −1), the weight of application D may be four, and the weight of application F may be unknown (i.e., there is no historical data with respect to application F). In this example, the modified order may be D, C, B, A, F, and E, where Application D is now at the front of the list and application E is last in the list, since Application D is the highest rated running task and Application E is the lowest weighted running task. Also, since the weight of application F is unknown, application F may by default receive a weight of zero.

In another example, according to at least one other embodiment where the first order is a reverse order of application startup, the applications may be ordered in the first list as E, D, C, B, A, and F, where application E is at the front of the list. This reverse order may now be modified based on the weight of each of the one or more running tasks to terminate. Continuing the example, the weight of application E may be two, the weight of Application D may be three, the weight of application C may be zero, the weight of Application B may be negative one (i.e., −1), the weight of application A may be four, and the weight of application F may be unknown (i.e., there is no historical data with respect to application F). In this example, the modified order may be A, D, E, F, C, and B, where Application A is now at the front of the list and application B is last in the list, since Application A is the highest rated running task and Application B is the lowest weighted running task. Also, since the weight of application F is unknown, application F may by default receive a weight of zero. As the two examples described above show, when two or more running tasks have the same weight, it is not critical which of these running tasks is placed before the others. It may be appreciated that the examples described above are not intended to be limiting, and that in embodiments of the present invention, the one or more running tasks to terminate may have different weights at any given time.

Next, at 210, the OS shutdown sequencing program 110A, 110B sends the termination request to the particular running task of the one or more running tasks to terminate in accordance with the current order of the created first list.

As described above with respect to step 206, when there is no historical data for any of the one or more running tasks to terminate, the "current order" may be the given order, whereas when there is the historical data for at least one of the one or more running tasks to terminate, the "current order" may be the modified order.

According to at least one embodiment where there is no historical data for any of the one or more running tasks to terminate, the termination request may be sent to the particular running task in accordance with the given order of the created first list. Continuing the example described above where the given order is random, the applications may be ordered in the first list as B, C, A, E, D, and F. In this example, the particular running task may be application B, and the termination request may be sent to application B. Continuing the example described above where the given order is the reverse order of application startup, the applications may be ordered in the first list as E, D, C, B, A, and F, where application E is at the front of the list. In this example, the particular running task may be application E, and the termination request may be sent to application E.

According to at least one embodiment where there is the historical data for the at least one of the one or more running tasks to terminate, the termination request may be sent to the particular running task in accordance with the modified order of the created first list. Continuing the example described above where the modified order is D, C, B, A, F, and E, the particular running task may be application D, and the termination request may be sent to application D. Thus, as shown in the examples described above, the particular running task may be the running task that is at the front of the created first list, since the running task at the front of the created first list has the highest likelihood of requiring the user input to terminate.

Then, at 212, the OS shutdown sequencing program 110A, 110B determines whether the particular running task requires the user input to terminate. Upon sending the termination request to the particular running task, the particular running task may prompt the user for manual input, as illustrated in FIG. 3. For example, the particular running task may display a prompt to the user asking, "Do you want to save changes to C:\New document.txt?" When the particular running task displays the prompt, the particular running task may be identified by the OS shutdown sequencing program 110A, 110B as requiring the user input to terminate. For example, where application D is the particular running task and where application D displays the prompt, the OS shutdown sequencing program 110A, 110B may determine application D requires the user input to terminate. As a corollary, when the particular running task does not display the prompt, the particular running task may be identified by the OS shutdown sequencing program 110A, 110B as not requiring the user input to terminate. Continuing the example described above, where application D is the particular running task and where application D does not display the prompt, the OS shutdown sequencing program 110A, 110B may determine application D does not require the user input to terminate.

In response to determining the particular running task requires the user input to terminate (step 212, "Yes" branch), the OS shutdown sequencing process 200 proceeds to step 214 to increase the weight of the particular running task. In response to determining the particular running task does not require the user input to terminate (step 212, "No" branch), the OS shutdown sequencing process 200 proceeds to step 216 to decrease the weight of the particular running task.

Next, at 214, the OS shutdown sequencing program 110A, 110B increases the weight of the particular running task. The increased weight of the particular running task may be added to the ML model as the historical data by the OS shutdown sequencing program 110A, 110B. The ML model may then learn from the historical data and use the increased weight of the particular running task to modify the given order of the one or more running tasks to terminate in the created first list during a subsequent implementation of OS shutdown sequencing process 200. Continuing the example described above where application D is the particular running task, the weight of application D may increase by one. For example, if application D previously had a weight of two, the weight of application D may be increased to three. Depending on the weights of any additional particular running tasks, described in further detail below with respect to step 218, during the subsequent implementation of the OS shutdown sequencing process 200, application D may maintain its position in the modified order of the created first list, or application D may be moved to a different position in the modified order of the created first list.

Then, at 216, the OS shutdown sequencing program 110A, 110B decreases the weight of the particular running task. The decreased weight of the particular running task may be added to the ML model as the historical data by the OS shutdown sequencing program 110A, 110B. The ML model may then learn from the historical data and use the decreased weight of the particular running task to modify the given order of the one or more running tasks to terminate in the created first list during a subsequent implementation of OS shutdown sequencing process 200. Continuing the example described above where application D is the particular running task, the weight of application D may decrease by one. For example, if application D previously had a weight of two, the weight of application D may be decreased to one. Depending on the weights of any additional particular running tasks, described in further detail below with respect to step 218, during the subsequent implementation of the OS shutdown sequencing process 200, application D may maintain its position in the modified order of the created first list, or application D may be moved to a different position in the modified order of the created first list.

Next, at 218, the OS shutdown sequencing program 110A, 110B determines whether there is the additional particular running task in the created first list. There may be at least one additional particular running task in the created first list whenever the created first list contains more than one running task to terminate. Thus, in embodiments of the present invention, the particular running task may be the first running task to terminate in the created first list, and the additional particular running task may be a subsequent running task to terminate in the created first list.

In response to determining there is the additional particular running task in the created first list (step 218, "Yes" branch), the OS shutdown sequencing process 200 reverts to step 210 to send the termination request to the additional particular running task. In response to determining there is no additional particular running task in the created first list (step 218, "No" branch), the OS shutdown sequencing process 200 ends.

It may be appreciated that in embodiments where there is the additional particular running task in the created first list, steps 210, 212, and 214 or 216 may be iterated until there is no additional particular running task in the created first list.

According to at least one embodiment where there is no historical data for any of the one or more running tasks to terminate, the termination request may be sent to the additional particular running task in accordance with the given order of the created first list. Continuing the example described above where the given order is random, the applications may be ordered in the first list as B, C, A, E, D, and F. In this example, the additional particular running task may be application C, and the termination request may be sent to application C. It may then be determined whether the additional particular running task requires the user input to terminate. In response to determining the additional particular running task requires the user input to terminate, the weight of the additional particular running task may be increased, as described above with respect to step 214, and the increased weight may be added to the ML model as the historical data. The ML model may then learn from the historical data and use the increased weight of the additional particular running task to modify the given order of the one or more running tasks to terminate in the created first list during the subsequent implementation of OS shutdown sequencing process 200. In response to determining the additional particular running task does not require the user input to terminate, the weight of the additional particular running task may be decreased, as described above with respect to step 216, and the decreased weight may be added to the ML model as the historical data. The ML model may then learn from the historical data and use the decreased weight of the additional particular running task to modify the given order of the one or more running tasks to terminate in the created first list during the subsequent implementation of OS shutdown sequencing process 200.

According to at least one embodiment where there is the historical data for the at least one of the one or more running tasks to terminate, the termination request may be sent to the additional particular running task in accordance with the modified order of the created first list. Continuing the example described above where the modified order is D, C, B, A, F, and E, the additional particular running task may be application C, and the termination request may be sent to application C. It may then be determined whether the additional particular running task requires the user input to terminate. In response to determining the additional particular running task requires the user input to terminate, the weight of the additional particular running task may be increased, as described above with respect to step 214, and the increased weight may be added to the ML model as the historical data. The ML model may then learn from the historical data and use the increased weight of the additional particular running task to re-modify the modified order of the one or more running tasks to terminate in the created first list during the subsequent implementation of OS shutdown sequencing process 200. In response to determining the additional particular running task does not require the user input to terminate, the weight of the additional particular running task may be decreased, as described above with respect to step 216, and the decreased weight may be added to the ML model as the historical data. The ML model may then learn from the historical data and use the decreased weight of the additional particular running task to re-modify the modified order of the one or more running tasks to terminate in the created first list during the subsequent implementation of OS shutdown sequencing process 200.

Then, at 220, the OS shutdown sequencing program 110A, 110B shuts down the OS. Once the termination request has been sent to the particular running task, and thereafter each additional particular running task, the OS may be shutdown, and if necessary any software updates may be completed. For example, when the modified order of the one or more running tasks to terminate in the created first list is A, B, C, D, E, and F, application A may be the particular running task, and the additional particular running tasks may be, in order, B, C, D, E, and F. Continuing the example, after sending the termination request to application F, there is no additional particular running task to terminate, and upon the actual termination of each of applications B, C, D, E, and F, the OS may be shutdown.

Referring now to FIG. 3, an exemplary diagram 300 depicting an input prompt that is displayed to a user during the process in FIGS. 2A and 2B is shown according to at least one embodiment. In the diagram 300, a window 302 appears in which the user is able to initiate an OS shutdown, an OS restart, or put the OS to sleep. During the OS shutdown sequence, the termination request may be sent to the particular running task, and subsequently each additional particular running task, as described above with respect to FIGS. 2A and 2B. The input prompt 304 may be displayed to the user for each running task that requires the user input to terminate. As used herein, each running task encompasses both the particular running task and each additional particular running task. Continuing the example above where the modified order of the one or more running tasks to terminate in the created first list is A, B, C, D, E, and F, the input prompt 304 for the particular running task (i.e., application A) may be displayed to the user asking, "Do you want to save changes to C:\New document.txt?" Continuing the example, the input prompt 304 for the additional particular running task (i.e., application B) may also be displayed to the user, and so on. In this manner, the termination request may be sent to the one or more running tasks more likely requiring the user input first, such that the input prompt 304 may be displayed to the user as early as possible during the OS shutdown sequence.

It may be appreciated that FIGS. 2A, 2B, and 3 provide only an illustration of one implementation and do not imply any limitations with regard to how different embodiments may be implemented. Many modifications to the depicted environments may be made based on design and implementation requirements.

Figure 4:
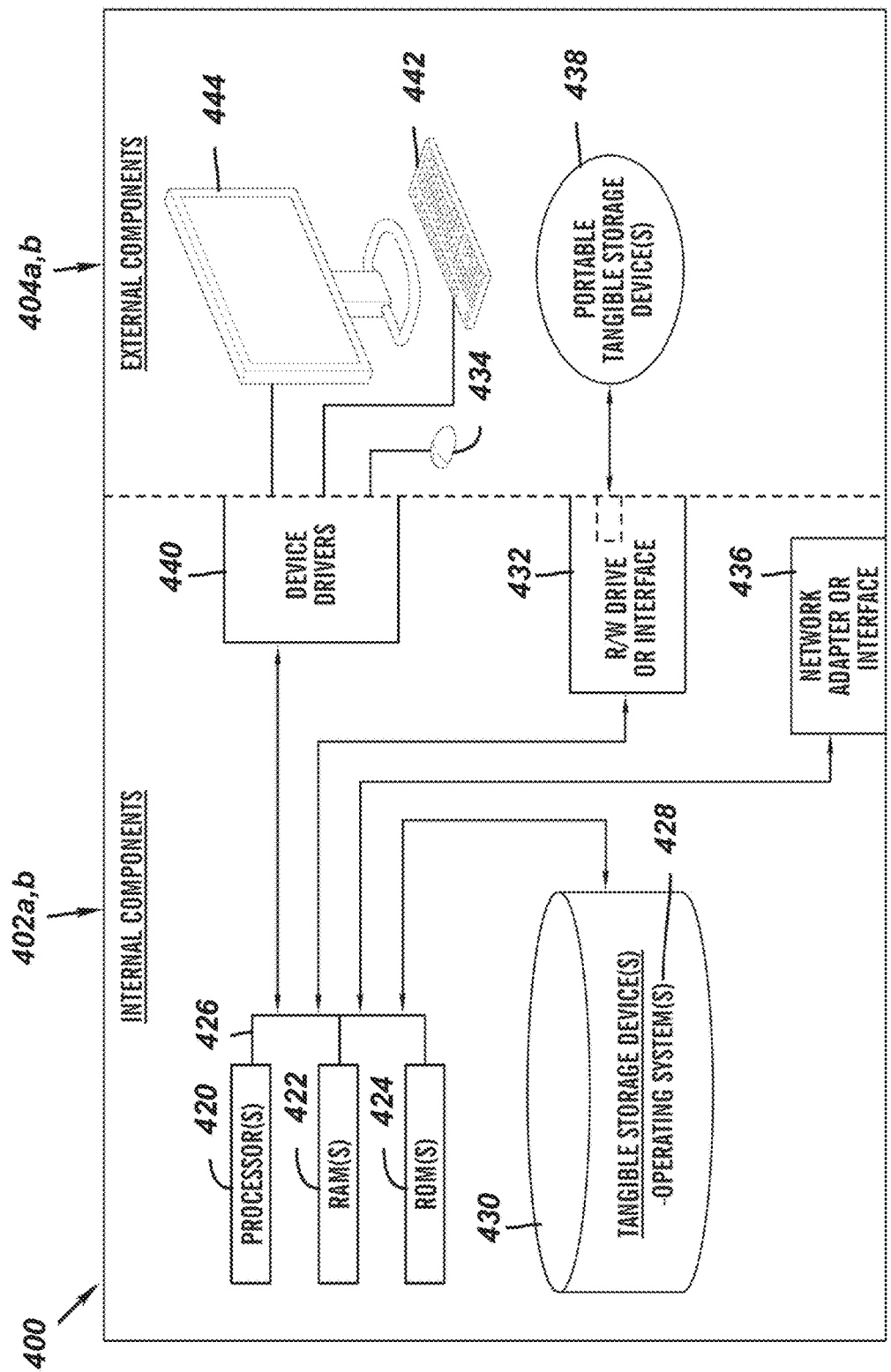
FIG. 4 is a functional block diagram of internal and external components of computers and servers depicted in FIG. 1 according to at least one embodiment.

FIG. 4 is a block diagram 400 of internal and external components of the client computing device 102 and the server 112 depicted in FIG. 1 in accordance with an embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

The data processing system 402, 404 is representative of any electronic device capable of executing machine-readable program instructions. The data processing system 402, 404 may be representative of a smart phone, a computer system, PDA, or other electronic devices. Examples of computing systems, environments, and/or configurations that may represented by the data processing system 402, 404 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 402*a,b* and external components 404a,b illustrated in FIG. 4. Each of the sets of internal components 402 include one or more processors 420, one or more computer-readable RAMs 422, and one or more computer-readable ROMs 424 on one or more buses 426, and one or more operating systems 428 and one or more computer-readable tangible storage devices 430. The one or more operating systems 428, the software program 108 and the OS shutdown sequencing program 110A in the client computing device 102 and the OS shutdown sequencing program 110B in the server 112 are stored on one or more of the respective computer-readable tangible storage devices 430 for execution by one or more of the respective processors 420 via one or more of the respective RAMs 422 (which typically include cache memory). In the embodiment illustrated in FIG. 4, each of the computer-readable tangible storage devices 430 is a magnetic disk storage device of an internal hard drive. Alternatively, each of the computer-readable tangible storage devices 430 is a semiconductor storage device such as ROM 424, EPROM, flash memory or any other computer-readable tangible storage device that can store a computer program and digital information.

Each set of internal components 402a,b also includes a RAY drive or interface 432 to read from and write to one or more portable computer-readable tangible storage devices 438 such as a CD-ROM, DVD, memory stick, magnetic tape, magnetic disk, optical disk or semiconductor storage device. A software program, such as the OS shutdown sequencing program 110A, 110B, can be stored on one or more of the respective portable computer-readable tangible storage devices 438, read via the respective RAY drive or interface 432, and loaded into the respective hard drive 430.

Each set of internal components 402a,b also includes network adapters or interfaces 436 such as a TCP/IP adapter cards, wireless Wi-Fi interface cards, or 3G or 4G wireless interface cards or other wired or wireless communication links. The software program 108 and the OS shutdown sequencing program 110A in the client computing device 102 and the OS shutdown sequencing program 110B in the server 112 can be downloaded to the client computing device 102 and the server 112 from an external computer via a network (for example, the Internet, a local area network or other, wide area network) and respective network adapters or interfaces 436. From the network adapters or interfaces 436, the software program 108 and the OS shutdown sequencing program 110A in the client computing device 102 and the OS shutdown sequencing program 110B in the server 112 are loaded into the respective hard drive 430. The network may comprise copper wires, optical fibers, wireless transmission, routers, firewalls, switches, gateway computers and/or edge servers.

Each of the sets of external components 404a,b can include a computer display monitor 444, a keyboard 442, and a computer mouse 434. External components 404a,b can also include touch screens, virtual keyboards, touch pads, pointing devices, and other human interface devices. Each of the sets of internal components 402a,b also includes device drivers 440 to interface to computer display monitor 444, keyboard 442, and computer mouse 434. The device drivers 440, R/W drive or interface 432, and network adapter or interface 436 comprise hardware and software (stored in storage device 430 and/or ROM 424).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
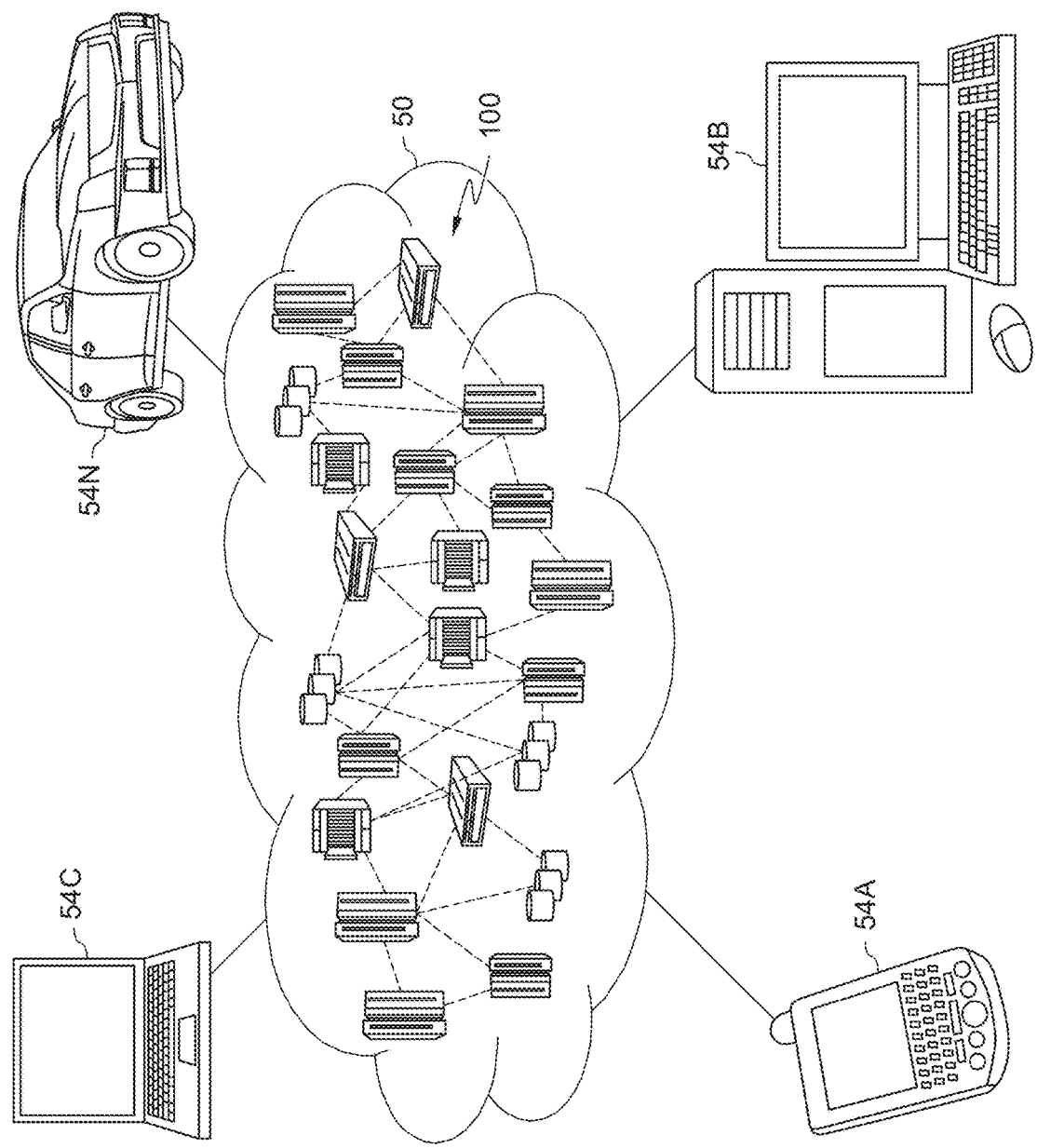
FIG. 5 depicts a cloud computing environment according to an embodiment of the present invention.

Referring now to FIG. 5, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 100 and cloud computing environment 50 can communicate with any type of computerized device over any type of network and/or network addressable connection (e.g., using a web browser).

Figure 6:
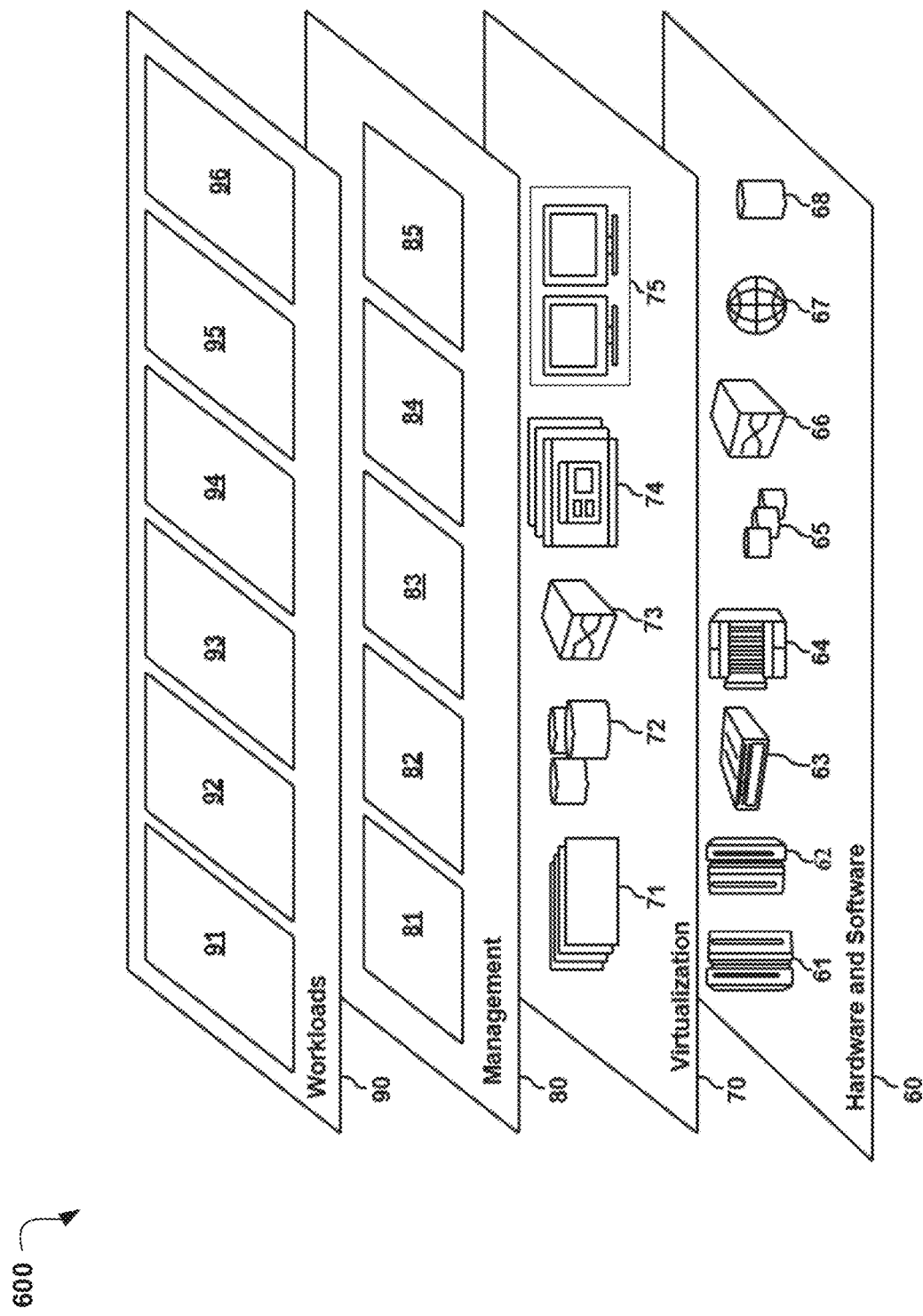
FIG. 6 depicts abstraction model layers according to an embodiment of the present invention.

Referring now to FIG. 6, a set of functional abstraction layers 600 provided by cloud computing environment 50 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and improving a shutdown sequencing of a computer OS 96. Improving a shutdown sequencing of a computer OS 96 may relate to determining whether one or more running tasks require user input to terminate in order to modify a given order of running tasks to terminate in a created first list based on a weight of each running task to terminate.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-based method of improving a shutdown sequencing of a computer operating system (OS), the method comprising:
  receiving a command to initiate an OS shutdown from a user;
  creating a first list of one or more running tasks to terminate according to a given order in response to receiving the command;
  determining whether there is historical data relating to at least one of the one or more running tasks to terminate as requiring user input to terminate; and
  in response to determining there is no historical data:
    sending a termination request to a particular running task of the one or more running tasks to terminate in accordance with a given order of the created first list;
    determining whether the particular running task requires the user input to terminate; and
    in response to determining the particular running task requires the user input to terminate:

increasing a weight of the particular running task, wherein the increased weight of the particular running task is added to a machine learning (ML) model as the historical data.

2. The computer-based method of claim 1, further comprising:
  determining whether there is an additional particular running task in the created first list; and
  in response to determining there is the additional particular running task in the created first list, iterating, until there is no additional particular running task in the created first list:
    sending the termination request to the additional particular running task in accordance with the given order of the created first list;
    determining whether the additional particular running task requires the user input to terminate; and
    in response to determining the additional particular running task requires the user input to terminate, increasing a weight of the additional particular running task, wherein the increased weight of the additional particular running task is added to the ML model as the historical data; and
  shutting down the OS.

3. The computer-based method of claim 2, further comprising:
  in response to determining the particular running task does not require the user input to terminate:
    decreasing the weight of the particular running task, wherein the decreased weight of the particular running task is added to the ML model as the historical data.

4. The computer-based method of claim 2, further comprising:
  in response to determining the additional particular running task does not require the user input to terminate, decreasing the weight of the additional particular running task, wherein the decreased weight of the additional particular running task is added to the ML model as the historical data.

5. The computer-based method of claim 2, further comprising:
  in response to determining there is the historical data:
    modifying the given order of the one or more running tasks to terminate in the created first list based on a weight of each running task to terminate;
    sending the termination request to the particular running task of the one or more running tasks to terminate in accordance with the modified order of the created first list;
    determining whether the particular running task requires the user input to terminate; and
    in response to determining the particular running task requires the user input to terminate:
      increasing the weight of the particular running task, wherein the increased weight of the particular running task is added to the ML model as the historical data.

6. The computer-based method of claim 5, further comprising:
  determining whether there is the additional particular running task in the created first list; and
  in response to determining there is the additional particular running task in the created first list, iterating, until there is no additional particular running task in the created first list:
    sending the termination request to the additional particular running task in accordance with the modified order of the created first list;
    determining whether the additional particular running task requires the user input to terminate; and
    in response to determining the additional particular running task requires the user input to terminate, increasing the weight of the additional particular running task, wherein the increased weight of the additional particular running task is added to the ML model as the historical data; and
  shutting down the OS.

7. The computer-based method of claim 6, wherein the modified order is an order where the one or more running tasks to terminate are arranged in the created first list from a highest weighted running task to a lowest weighted running task.

8. A computer system, the computer system comprising:
  one or more processors, one or more computer-readable memories, one or more computer-readable tangible storage medium, and program instructions stored on at least one of the one or more computer-readable tangible storage medium for execution by at least one of the one or more processors via at least one of the one or more computer-readable memories, wherein the computer system is capable of performing a method comprising:
  receiving a command to initiate an OS shutdown from a user;
  creating a first list of one or more running tasks to terminate according to a given order in response to receiving the command;
  determining whether there is historical data relating to at least one of the one or more running tasks to terminate as requiring user input to terminate; and
  in response to determining there is no historical data:
    sending a termination request to a particular running task of the one or more running tasks to terminate in accordance with a given order of the created first list;
    determining whether the particular running task requires the user input to terminate; and
    in response to determining the particular running task requires the user input to terminate:
      increasing a weight of the particular running task, wherein the increased weight of the particular running task is added to a machine learning (ML) model as the historical data.

9. The computer system of claim 8, the method further comprising:
  determining whether there is an additional particular running task in the created first list; and
  in response to determining there is the additional particular running task in the created first list, iterating, until there is no additional particular running task in the created first list:
    sending the termination request to the additional particular running task in accordance with the given order of the created first list;
    determining whether the additional particular running task requires the user input to terminate; and
    in response to determining the additional particular running task requires the user input to terminate, increasing a weight of the additional particular running task, wherein the increased weight of the additional particular running task is added to the ML model as the historical data; and
  shutting down the OS.

10. The computer system of claim 9, the method further comprising:
in response to determining the particular running task does not require the user input to terminate:
decreasing the weight of the particular running task, wherein the decreased weight of the particular running task is added to the ML model as the historical data.

11. The computer system of claim 9, the method further comprising:
in response to determining the additional particular running task does not require the user input to terminate, decreasing the weight of the additional particular running task, wherein the decreased weight of the additional particular running task is added to the ML model as the historical data.

12. The computer system of claim 9, the method further comprising:
in response to determining there is the historical data:
modifying the given order of the one or more running tasks to terminate in the created first list based on a weight of each running task to terminate;
sending the termination request to the particular running task of the one or more running tasks to terminate in accordance with the modified order of the created first list;
determining whether the particular running task requires the user input to terminate; and
in response to determining the particular running task requires the user input to terminate:
increasing the weight of the particular running task, wherein the increased weight of the particular running task is added to the ML model as the historical data.

13. The computer system of claim 12, the method further comprising:
determining whether there is the additional particular running task in the created first list; and
in response to determining there is the additional particular running task in the created first list, iterating, until there is no additional particular running task in the created first list:
sending the termination request to the additional particular running task in accordance with the modified order of the created first list;
determining whether the additional particular running task requires the user input to terminate; and
in response to determining the additional particular running task requires the user input to terminate, increasing the weight of the additional particular running task, wherein the increased weight of the additional particular running task is added to the ML model as the historical data; and
shutting down the OS.

14. The computer system of claim 13, wherein the modified order is an order where the one or more running tasks to terminate are arranged in the created first list from a highest weighted running task to a lowest weighted running task.

15. A computer program product, the computer program product comprising:
one or more computer-readable storage medium and program instructions stored on at least one of the one or more computer-readable storage medium, the program instructions executable by a processor capable of performing a method, the method comprising:
receiving a command to initiate an OS shutdown from a user;
creating a first list of one or more running tasks to terminate according to a given order in response to receiving the command;
determining whether there is historical data relating to at least one of the one or more running tasks to terminate as requiring user input to terminate; and
in response to determining there is no historical data:
sending a termination request to a particular running task of the one or more running tasks to terminate in accordance with a given order of the created first list;
determining whether the particular running task requires the user input to terminate; and
in response to determining the particular running task requires the user input to terminate:
increasing a weight of the particular running task, wherein the increased weight of the particular running task is added to a machine learning (ML) model as the historical data.

16. The computer program product of claim 15, the method further comprising:
determining whether there is an additional particular running task in the created first list; and
in response to determining there is the additional particular running task in the created first list, iterating, until there is no additional particular running task in the created first list:
sending the termination request to the additional particular running task in accordance with the given order of the created first list;
determining whether the additional particular running task requires the user input to terminate; and
in response to determining the additional particular running task requires the user input to terminate, increasing a weight of the additional particular running task, wherein the increased weight of the additional particular running task is added to the ML model as the historical data; and
shutting down the OS.

17. The computer program product of claim 16, the method further comprising:
in response to determining the particular running task does not require the user input to terminate:
decreasing the weight of the particular running task, wherein the decreased weight of the particular running task is added to the ML model as the historical data.

18. The computer program product of claim 16, the method further comprising:
in response to determining the additional particular running task does not require the user input to terminate, decreasing the weight of the additional particular running task, wherein the decreased weight of the additional particular running task is added to the ML model as the historical data.

19. The computer program product of claim 16, the method further comprising:
in response to determining there is the historical data:
modifying the given order of the one or more running tasks to terminate in the created first list based on a weight of each running task to terminate;
sending the termination request to the particular running task of the one or more running tasks to terminate in accordance with the modified order of the created first list;

determining whether the particular running task requires the user input to terminate; and in response to determining the particular running task requires the user input to terminate:

increasing the weight of the particular running task, wherein the increased weight of the particular running task is added to the ML model as the historical data.

20. The computer program product of claim 19, the method further comprising:

determining whether there is the additional particular running task in the created first list; and in response to determining there is the additional particular running task in the created first list, iterating, until there is no additional particular running task in the created first list:

sending the termination request to the additional particular running task in accordance with the modified order of the created first list;

determining whether the additional particular running task requires the user input to terminate; and in response to determining the additional particular running task requires the user input to terminate, increasing the weight of the additional particular running task, wherein the increased weight of the additional particular running task is added to the ML model as the historical data; and shutting down the OS.

* * * * *